United States Patent
Kim et al.

(10) Patent No.: US 8,811,218 B2
(45) Date of Patent: Aug. 19, 2014

(54) METHOD AND DEVICE FOR ALLOCATING PERSISTENT RESOURCE IN MOBILE COMMUNICATION SYSTEM

(75) Inventors: Seho Kim, Seoul (KR); Heewon Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/594,059

(22) Filed: Aug. 24, 2012

(65) Prior Publication Data
US 2013/0051266 A1 Feb. 28, 2013

(30) Foreign Application Priority Data
Aug. 24, 2011 (KR) .................... 10-2011-0084387

(51) Int. Cl.
H04J 1/16 (2006.01)
H04W 4/00 (2009.01)

(52) U.S. Cl.
USPC ............ 370/252; 370/329; 370/394; 370/468

(58) Field of Classification Search
USPC ......... 370/252, 328, 329, 338, 394, 236, 465, 370/468
See application file for complete search history.

(56) References Cited

U.S. PATENT DOCUMENTS

| | | | |
|---|---|---|---|
| 2008/0002617 A1* | 1/2008 | Peisa et al. ................... | 370/329 |
| 2008/0232332 A1* | 9/2008 | Kaminski et al. ............. | 370/336 |
| 2009/0052367 A1* | 2/2009 | Cai et al. ....................... | 370/315 |
| 2009/0135807 A1* | 5/2009 | Shrivastava et al. .......... | 370/352 |
| 2009/0245272 A1* | 10/2009 | Peisa et al. .................... | 370/428 |
| 2010/0085927 A1* | 4/2010 | Torsner et al. ................ | 370/329 |
| 2010/0220683 A1* | 9/2010 | Novak et al. .................. | 370/330 |
| 2011/0110312 A1* | 5/2011 | Zhao et al. .................... | 370/329 |
| 2012/0147830 A1* | 6/2012 | Lohr et al. .................... | 370/329 |
| 2012/0314600 A1* | 12/2012 | Zeira ............................. | 370/252 |
| 2014/0023027 A1* | 1/2014 | Torsner et al. ................ | 370/329 |

* cited by examiner

Primary Examiner — Andrew Lee
(74) Attorney, Agent, or Firm — Jefferson IP Law, LLP

(57) ABSTRACT

A method and a device for allocating a persistent resource in a mobile communication system are provided. In a broadband mobile communication system such as an IEEE 802.16m system, when allocating a persistent resource, because the terminal may transmit a Hybrid Automatic Repeat reQuest (HARQ) sub packet in a continuous frame without receiving the HARQ feedback from the base station, uplink coverage may be extended. When persistent resource allocation is used in uplink, the base station may transmit an HARQ sub packet without receiving the HARQ feedback during the persistent resource allocation period to improve uplink coverage of an allocated persistent resource.

14 Claims, 7 Drawing Sheets

METHOD AND DEVICE FOR ALLOCATING PERSISTENT RESOURCE IN MOBILE COMMUNICATION SYSTEM

PRIORITY

This application claims the benefit under 35 U.S.C. §119(a) of a Korean patent application filed on Aug. 24, 2011 in the Korean Intellectual Property Office and assigned Serial No. 10-2011-0084387, the entire disclosure of which is hereby incorporated by reference.

BACKGROUND OF THE INVENTION

1. Field of the Invention

The present invention relates to a method and a device for allocating a resource, More particularly, the present invention relates to a method for allocating a persistent resource and a device thereof.

2. Description of the Related Art

Research for providing services having various Quality of Service (QoS) to a user using transmission speed having about 100 Mbps has been actively performed in a fourth generation (4G) being a next generation communication system. An Institute of Electrical and Electronics Engineers (IEEE) 802.16 system is a representative example of the communication system. The IEEE 802.16 system is a communication system using an Orthogonal Frequency Division Multiplexing (OFDM)/Orthogonal Frequency Division Multiple Access (OFDMA) scheme in order to support a broadband transmission network in a Physical Channel.

Resource allocation of the IEEE 802.16m system uses non-persistent resource allocation and persistent resource allocation method, and a Hybrid Automatic Repeat reQuest (HARQ) scheme. For example, a terminal communicates with a base station using an allocated resource. Upon retransmission from the base station, the terminal needs to transmit a retransmission packet and an initial transmission packet of an allocated persistent resource in the same subframe. In this case, when the terminal is situated in a cell boundary or a location whose communication environment is poor, it is difficult for the terminal to successively transmit a packet due to insufficient power. This causes a problem of reducing a coverage of the terminal.

Therefore, a need exists for an apparatus and method for allocating a persistent resource which enables a terminal and a base station to efficiently communicate with each other.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for allocating a persistent resource which enables a terminal and a base station to efficiently communicate with each other, and a device thereof.

To do this, when allocating a persistent resource, the base station checks a communication environment. When the communication environment is poor, the base station is controlled such Hybrid Automatic Repeat reQuest (HARQ) feedback is not transmitted to the terminal but the terminal transmits a packet. When allocating the persistent resource, the terminal does not received HARQ feedback from the base station in uplink but transmit an HARQ sub packet.

In a case in which a persistent resource is allocated, if a communication environment of the terminal is poor, the present invention enables a terminal not to receive HARQ feedback from the base station in uplink but transmit HARQ sub packet.

When allocating a persistent resource, the present invention enables the terminal to transmit HARQ packet from a base station without receiving HARQ feedback in uplink when a communication environment is poor.

In accordance with an aspect of the present invention, a method for allocating a persistent resource in a mobile communication system is provided. The method includes determining an error rate of a received packet, transmitting a uplink persistent resource allocation Information Element (IE) including an N_frame which continuously transmits during a persistent allocation period when the error rate of the received packet exceeds a preset reference value, and receiving the same packets of the N_frame during the persistent resource allocation period and not transmitting HRQ Feedback Allocation (HFA) feedback according to the reception of the packet.

In accordance with another aspect of the present invention, a method for allocating a persistent resource in a mobile communication system is provided. The method includes transmitting a uplink persistent resource allocation IE of a first transmission mode when a traffic service of persistent resource allocation is requested, the first transmission mode being a transmission mode having HFA feedback, determining an error rate of a packet received in the first transmission mode, and maintaining a persistent resource allocation Identification (ID) of a first transmission mode when the error rate of the packet is less than or equal to a preset reference value, transmitting a uplink persistent resource allocation IE of a second transmission mode including an N_frame which continuously transmits during a persistent allocation period when the error rate of the packet exceeds the preset reference value, the second transmission mode being a transmission mode in which HFA feedback is not performed, and receiving the same packets of the N_frame during the persistent resource allocation period and not transmitting HFA feedback according to the reception of the packet.

In accordance with another aspect of the present invention, a method for allocating a persistent resource in a mobile communication system is provided. The method includes transmitting a uplink persistent resource allocation IE in a first transmission mode or a second transmission mode to a terminal according to a communication environment of the terminal by a base station, wherein the first transmission mode processing step includes: transmitting a uplink persistent resource allocation IE of a first transmission mode by a base station when a traffic service of persistent resource allocation is requested, the first transmission mode being a transmission mode having HFA feedback, transmitting a packet in the first transmission mode to the base station by the terminal, determining an error rate of a packet received in the first transmission mode by the base station, and transmitting HFA feedback indicating whether an error occurs in the received packet when an error rate of the packet is less than or equal to a preset reference value, and transmitting a retransmission packet to the base station by the terminal when received HFA feedback is NACK feedback, and wherein the second transmission mode processing step includes: transmitting a uplink persistent resource allocation IE of a second transmission mode including an N_frame which continuously transmits during a persistent allocation period by the base station when the error rate of the packet exceeds the preset reference value, the second transmission mode being a transmission mode in which HFA feedback is not performed, transmitting identical packets of the N_frame during a persistent resource allocation period by the terminal, and receiving the identical packets of the N_frame during the persistent resource allocation period by the base station, not transmitting HFA feedback according to reception of the packet by the base station.

In accordance with another aspect of the present invention, a mobile communication system for allocating a persistent resource is provided. The system includes a base station checking an error rate of a received packet, transmitting a uplink persistent resource allocation information element (IE) including an N_frame which continuously transmits during a persistent allocation period when the error rate of the packet exceeds a preset reference value, and receiving the same packets of the N_frame during the persistent resource allocation period and not transmitting HFA feedback according to the reception of the packet, and a terminal continuously transmitting the same packet of an N_frame during the persistent resource allocation period when the base station receives the uplink persistent resource allocation IE including the N_frame.

In accordance with an aspect of the present invention, a method for allocating a persistent resource in a mobile communication system. The method includes determining an error rate of a received packet, and selecting a transmission mode for a persistent resource allocation operation among a plurality of transmission modes according to the determined error rate of the received packet.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
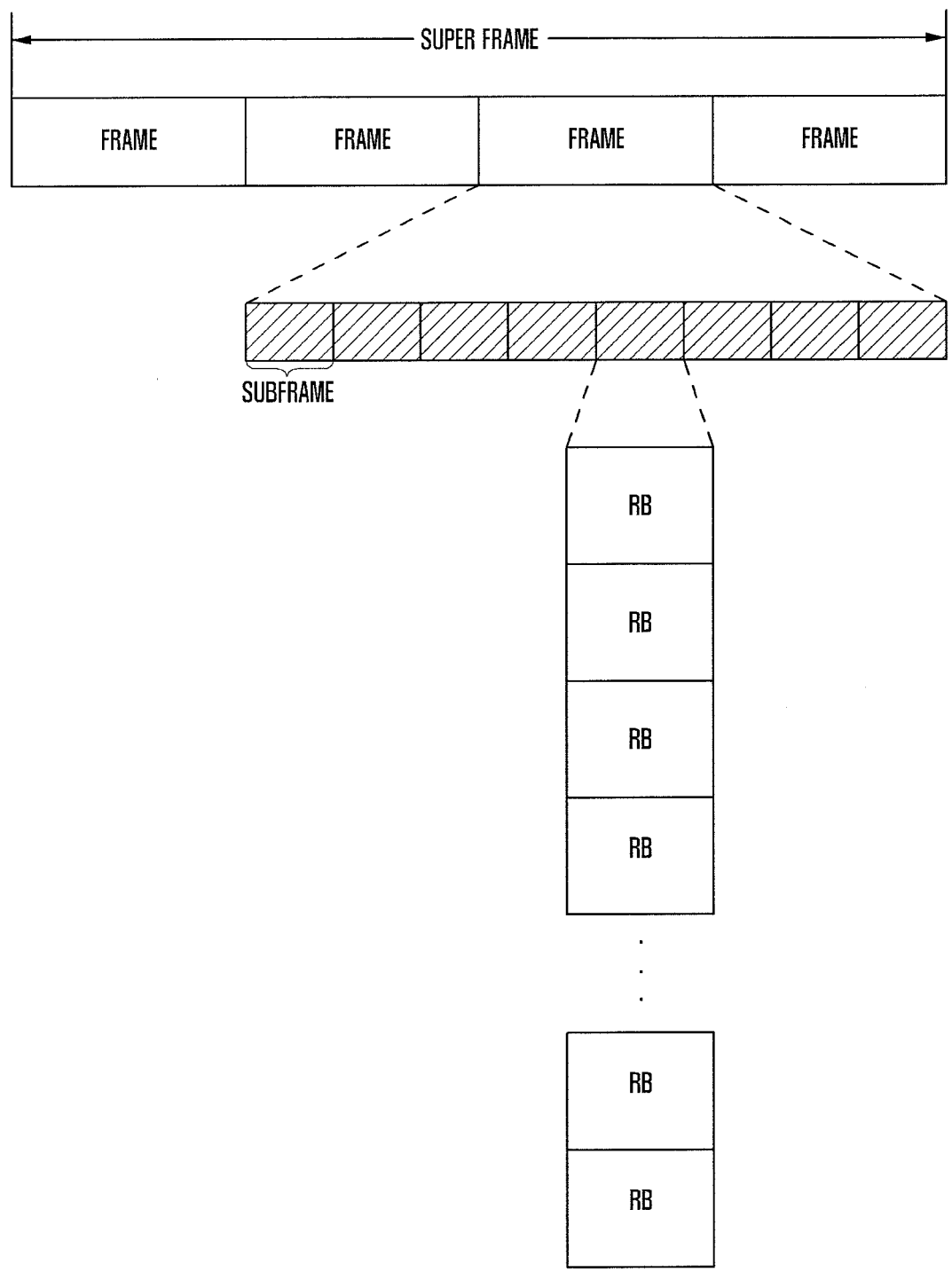
FIG. 1 is a diagram illustrating an example of a frame structure in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the following is a group resource allocating technology for supporting various types of traffics in a broadband wireless communication system according to an exemplary embodiment of the present invention. The exemplary embodiment of the present invention has illustrated that a wireless communication system in Orthogonal Frequency Division Multiplexing (OFDM)/Orthogonal Frequency Division Multiple Access (OFDMA) scheme is described by way of example. However, the present invention may be equally applied to a wireless communication system in another scheme.

In a broadband wireless communication system such as the Institute of Electrical and Electronics Engineers (IEEE) 802.16 system, a base station allocates a resource to respective terminals for transmission/reception of the packet. Further, the base station transmits a resource allocation Information Element (IE) indicating resource allocating results such as a location and the size of the allocated resource, modulation scheme, and code rate to a terminal through a downlink channel. In general, a message indicating a resource allocating result for uplink communication and a message indicating a resource allocating result for downlink communication are separately configured. A unit of information necessary for allocating one resource refers to the resource allocation IE. The resource allocation is performed for resources in a predetermined time period. In this case, because a resource for general data packets is allocated for each predetermined time period, resource allocation IE with respect to this is transmitted for predetermined time period. However, in a case of a Voice over Internet Protocol (VoIP) service in which a packet is periodically transmitted, transmission of an map IE every transmission of packet unnecessarily consumes a resource. In a case of a packet such as a VoIP packet having a periodic transmission period, a mobile communication system persistently allocates a resource to use a persistent allocation method for reducing resource consumption due to resource allocation IE. When the persistent allocation method is used, in a case of downlink communication, a base station transmits resource allocation IE and packets only when allocating an initial resource, and transmits only the packet without the resource allocation IE. Accordingly, the terminal continuously uses an allocated persistent resource without resource allocation IE before allocation release information or allocation change information is received. In the fixed allocation method, when allocated information is conventionally changed, the resource allocation IE needs to be transmitted for new fixed allocation. In a case of allocated persistent resources, when allocation release information of the VoIP package is received, the allocated persistent resource is released.

As described above, resource allocation in the IEEE 802.16m system includes non-persistent resource allocation and persistent resource allocation. When allocating the persistent resource, a sending end periodically transmits an initial transmission packet with a predetermined period using an allocated persistent resource. Further, when demodulation of initial transmission packets to be periodically transmitted fails, a receiving end requests a Hybrid Automatic Repeat reQuest (HARQ) retransmission packet to the sending end. When receiving feedback of NACK from the base station after transmitting an initial packet of an allocated persistent resource, a terminal transmits a retransmission packet in synchronous HARQ timing. When a corresponding retransmission operation is not completed until a next allocated persistent resource transmits an initial transmission packet, an HARQ retransmission packet and an initial transmission packet of an allocated persistent resource in current progress need to be transmitted in the same subframe. In a case of a terminal located in a boundary part of a cell in uplink, power consumption is high for transmitting a packet. When simultaneously transmitting an initial transmission packet and a retransmission packet of the allocated persistent resource, the terminal has a difficulty in simultaneously transmitting the initial transmission packet and the retransmission packet successively due to insufficient power. This results in reduction in coverage of the terminal. To extend the coverage of the terminal in uplink, when allocating a persistent resource, it needs to prevent a retransmission packet of the allocated persistent resource from being transmitted together with an initial allocated transmission packet.

To prevent a retransmission packet of an allocated persistent resource from being transmitted together with an initial transmission packet, it is preferable to complete retransmission of an allocated persistent resource during a persistent resource allocation period.

Because the IEEE 802.16m system supports a synchronous HARQ in uplink, retransmission time is determined in synchronous HARQ timing. When retransmission makes progress during a persistent resource allocation period in HARQ timing in uplink, the coverage of the terminal is reduced because of less retransmission. When supporting persistent resource allocation in uplink of the IEEE 802.16m system, there is a need for a method for extending the coverage of the terminal.

FIG. 1 is a diagram illustrating an example of a frame structure in a broadband wireless communication system according to an exemplary embodiment of the present invention.

Referring to FIG. 1, a super frame includes a plurality of frames, each frame includes a plurality of subframes, and each subframe includes a plurality of OFDMA symbols. Resource allocation is performed in a resource in each subframe as a target, and a resource in each subframe is allocated for each Resource Block (RB). That is, the integer number of resource blocks are allocated to a terminal communicating with the base station.

Further, the map message is transmitted for each subframe. In this case, map IEs included in the map message indicate resource allocation results, respectively, and each of the map IEs is transmitted to the terminal. Then, the terminal processes a Cyclic Redundancy Check (CRC) using an allocated certain sequence. For example, when receiving map IEs, the terminal CRC-checks the received map IEs with an allocated sequence to identify a map IE for the terminal Such a map IE coding scheme refers to a separating coding.

The persistent resource allocation is performed for a traffic in which a packet is periodically generated. For example, VoIP may be a service in which persistent resource allocation is achieved. When allocating the persistent resource, an allocation period of an allocated persistent packet is determined using a persistent resource allocation period. In this case, the persistent resource allocation period is expressed by the number of frames. As the allocated persistent packet, a packet is transmitted in a fixed location according to the persistent resource allocation period. when there is no changed allocation information comparing with a previous packet transmission, packet transmission is achieved without a persistent resource allocation IE.

When a persistent resource is allocated, because a location transmitting a packet is fixed and accordingly there is not a need for repeated resource allocation information, a sending end may allocate a persistent resource without resource allocation IE. However, when retransmitting an HARQ allocating an Automatic Repeat Request (ARQ) Channel Identification (ACID) of data burst transmitted every transmission of persistent resource allocation, the packet may be identified. Because it is unnecessary to transmit Assignment IE so as to provide the ACID, a start value of an ACID and the number of ACIDs used during allocating a persistent resource are determined during allocating a persistent resource to be circulated and used according to the number of ACIDs from the start of the ACID.

Figure 2:
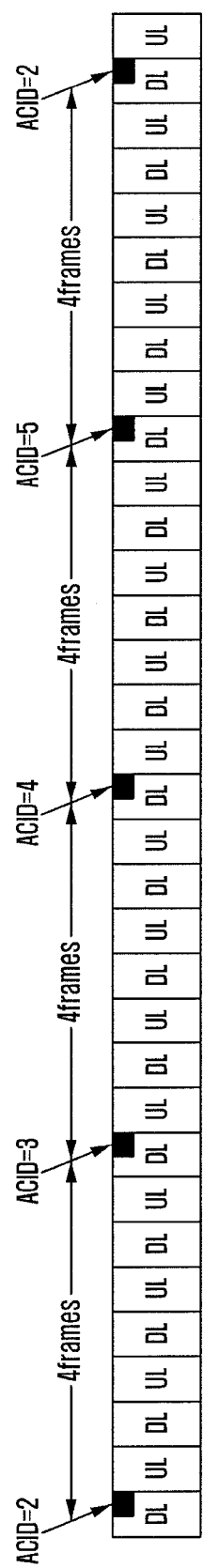
FIG. 2 is a diagram illustrating a example of circulating and using an Automatic Repeat Request (ARQ) Channel Identification (ACID) upon allocating a persistent resource using a resource allocating period and the number of ACIDs necessary for allocating a persistent resource in a method for allocating the persistent resource according to an exemplary embodiment of the present invention.

FIG. 2 is a diagram illustrating a example of circulating and using an ACID upon allocating a persistent resource using a resource allocating period and the number of ACIDs necessary for allocating a persistent resource according to an exemplary embodiment of the present invention. It is assumed in FIG. 2 that a persistent resource allocation period is four frames, and an ACID is 2, 3, 4, 5. Referring to FIG. 2, when the persistent resource allocation period is 4 frames, the ACID start value is 2, and the number N_ACID of ACIDs necessary for the persistent resource allocation is 4, a transmitter continuously circulates and uses an ACID of the packet in an order of 2, 3, 4, 5, 2, 3, 4, 5 each time the persistent resource is transmitted. Because of this reason, when allocating the persistent resource, there is a need for a persistent resource allocation period and the number N_ACID of ACIDs necessary for persistent resource allocation.

An IEEE 802.16m system use a synchronous HARQ scheme in uplink. Synchronous HARQ transmission is a scheme of transmitting a retransmission packet in a resource allocation location of an initial transmission packet. In this case, the base station does not transmit a resource allocation IE for transmitting the retransmission packet to the terminal. As the allocated persistent resource, an initial transmission packet is transmitted every persistent resource allocation period.

Initial transmission operation of an allocated persistent resource in uplink and a retransmission operation will be described with reference to FIG. 2. Here, when an error occurs in a transmission packet of ACID 2 to receive NACK HARQ feedback, a transmitted needs to retransmit an ACID 2 packet. In this case, a transmitter transmits a retransmission packet of ACID=2 and an initial transmission packet of ACID=3 in the same subframe in a location of a frame 5. In this case, when the transmitter is a terminal and the terminal is located in a boundary part, the terminal simultaneously transmits an initial transmission packet and a retransmission packet of an allocated persistent resource in a state that large power consumption is achieved in transmitting one packet. In this case, the coverage of the terminal is reduced due to insufficient power. Accordingly, it is preferable not to transmit an initial transmission packet and a retransmission packet of the allocated persistent resource in one subframe. To do this, it is preferable to transmit the retransmission packet before transmitting a next initial transmission packet (namely, an initial transmission packet using a next allocated persistent resource). When using synchronous HARQ transmission, a retransmission time point of uplink is determined according to an initial transmission time point. In a case of a terminal located in a boundary of a cell, an initial transmission packet and a retransmission packet of the allocated persistent resource are transmitted for each one subframe, the coverage of the terminal is reduced due to insufficient power. Accordingly, retransmission of the allocated persistent resource needs to be completed before initial transmission. Because the initial transmission packet is transmitted with a persistent resource allocation period in a case of persistent resource allocation, transmission of the retransmission packet needs to be completed during a fixed allocation period. A transmission time point of a retransmission packet is determined according to a transmission time point of an initial transmission packet in uplink of the IEEE 802.16m system. Here, it is assumed that the persistent resource allocation period is 40 msec. When initial packet transmission in the persistent resource allocation is achieved with default Transmission Time Interval (TTI), because one frame is required for retransmission packet transmission, as shown in FIG. 2, if the persistent resource allocation period is 4, the retransmission is possible three times by a next persistent resource allocation period. When the initial packet transmission is achieved during a Long TTI (e.g., 20 ms), because two frames are required for retransmission packet transmission, the retransmission is possible once by a next persistent resource allocation period.

To extend the coverage of the allocated persistent resource in uplink of the IEEE 802.16m system, the retransmission needs to be further achieved during a persistent resource allocation period. The reason not to further perform retransmission in an IEEE 802.16m system during a persistent resource allocation period that it receives HARQ feedback from the base station to determined the retransmission. To further perform synchronous HARQ retransmission, there is a need for a method for determining HARQ retransmission without receiving HARQ feedback. Exemplary embodiments of the present invention suggest a method for transmitting an HARQ sub packet without using HARQ feedback when allocating the persistent resource. When allocating the persistent resource, the present invention determines whether to transmit an HARQ sub packet is performed after reception of HARQ feedback information or without the HARQ feedback information. That is, the exemplary embodiment of the present invention suggests a method for transmitting a packet while performing a transmission mode (hereinafter referred to as 'first transmission mode') performing HARQ feedback according to a communication environment and a transmission mode (hereinafter referred to as 'second transmission mode') without performing the HARQ feedback when a transmitter allocates a persistent resource to communicate with. Here, the first transmission mode (Transmission mode '0b0') is a scheme of transmitting a HARQ sub packet using a HARQ feedback channel, and HARQ Feedback Allocation (HFA) is allocated in a UL Persistent Assignment A-MAP IE. When the transmission mode is an HARQ Subpacket Transmission mode '0b0', HFA, Initial_ACID, N_ACID, SPID, AI_SN fields are required for retransmission operation. The Initial_ACID refers a first ACID during circulation, and N_ACID refers to the number of ACIDs used during circulation. The allocated persistent resource is operated using ACIDs corresponding to the N_ACID such that initial and retransmission do not overlap each other. AI_SN is needed to distinguish retransmission from initial transmission, and SPID is needed to distinguish respective retransmission sub packets from each other.

In the meantime, the second transmission mode (Transmission mode '0b1') is a scheme of transmitting an HARQ sub packet without an HARQ feedback channel, and an HRF is not allocated in a UL Persistent Assignment A-MAP IE. Because the second transmission mode is a mode for extending a coverage of uplink, HARQ sub packet transmission may support the Long TTI. Further, in the second transmission mode, a fixedly allocated HARQ sub packet in a continuous frame is transmitted in a state there is no feedback. In this case, the maximum number of allocable frames is an allocation period. In this case, N_Frame indicates the number of continuous frames of a transmitted HARQ sub packet (e.g., may be selected from 2, 3, 4 as shown in FIG. 2). The selected N_Frame should be equal to or less than a persistent resource allocation period. Because an allocated persistent initial transmission packet and a retransmission packet do not collide with each other in the second transmission mode, an N_ACID is unnecessary. Accordingly, in this case, a used ACID indicates an HARQ sub packet, and ACID circulation is not applied. An SPID of HARQ Long TTI sub packets transmitted during the N_Frame has the range of 0~3. An SPDI of an HARQ long TTI sub packet transmitted in a first frame is zero and an SPDI of an HARQ long TTI sub packet transmitted in a next frame is one during the N_Frame period. As the frame is increased, the SPID is sequentially increased.

A following Table 1 lists an example of a UL Persistent A-MAP IE including information of the first transmission mode and the second transmission mode in an IEEE 802.16m system according to the exemplary embodiment of the present invention.

TABLE 1

| Syntax | Size (bit) | Description/Notes |
|---|---|---|
| UL Persistent Allocation A-MAP_IE ( ) { | — | — |
| A-MAP IE Type | 4 | |
| Allocation Period | 2 | Period of persistent allocation If (Allocation Period == 0b00), it indicates the deallocation of a persistently allocated resource. 0b00: deallocation 0b01: 2 frames 0b10: 4 frames 0b11: 8 frames |
| If (Allocation Period==0b00){ | | |
| Resource Index | 11 | Confirmation of the resource index for a previously assigned persistent resource that has been deallocated 512 FFT size: 0 in first 2 MSB bits + 9 bits for resource index 1024 FFT size: 11 bits for resource index 2048 FFT size: 11 bits for resource index Resource index includes location and allocation size |
| TTI and Relevance | 2 | Indicates the TTI type and the location of UL subframe relevant to this A-MAP. 0b00: long TTI 0b01: default TTI, the first UL subframe relevant to this A-MAP 0b10: default TTI, the second UL subframe relevant to this A-MAP 0b11: default TTI, the third UL subframe relevant to this A-MAP |
| HFA | 6 | Explicit Index for HARQ Feedback Allocation to acknowledge receipt of deallocation AMAP IE |
| Reserved | 15 | Reserved bits |
| } else if (Allocation Period != 0b00){ | | |
| $I_{SizeOffset}$ | 5 | Offset used to compute burst size index |
| $M_t$ | 1 | Number of streams in transmission $M_t \leq N_t$, up to 2 streams per AMS supported Nt: Number of transmit antennas at the AMS 0b0: 1 stream 0b1: 2 streams |
| TNS | 2 | Total number of streams in the LRU for CSM 0b00: 1 stream 0b01: 2 streams 0b10: 3 streams 0b11: 4 streams |
| If(TNS> $M_t$){ | | |
| SI | 2 | First pilot index for CSM with TNS = 2 streams: 0b00, 0b01 First pilot index for CSM with TNS = 3, 4 streams: 0b00, 0b01, 0b10, 0b11 |
| } else if (TNS == $M_t$) | | |
| MEF | 1 | MIMO encoder format 0b0: SFBC 0b1: Vertical encoding |
| Reserved } | 5 | |
| PF | 1 | Precoding Flag 0b0: non adaptive precoding 0b1: adaptive precoding using the precoder of rank $M_t$ of the AMS.'s choice |
| Resource Index | 11 | Confirmation of the resource index for a previously assigned persistent resource that has been deallocated 512 FFT size: 0 in first 2 MSB bits + 9 bits for resource index 1024 FFT size: 11 bits for resource index 2048 FFT size: 11 bits for resource index Resource index includes location and allocation size |
| Transmission mode | 1 | HARQ subpacket transmission mode 0b0: HARQ subpacket transmission with HFA 0b1: HARQ subpacket transmission without HFA |
| If (Transmission mode == 0b0){ | | |
| TTI and Relevance | 2 | Indicates the TTI type and the location of UL subframe relevant to this A-MAP. 0b00: long TTI 0b01: default TTI, the first UL subframe relevant to this A-MAP 0b10: default TTI, the second UL subframe relevant to this A-MAP 0b11: default TTI, the third UL subframe relevant to this A-MAP |
| HFA | 3 | HARQ Feedback Allocation |
| N_ACID | 2 | Number of ACIDs for implicit cycling of HARQ channel identifier 0b00: 1 0b01: 2 0b10: 3 0b11: 4 |
| Initial_ACID | 4 | Initial value of HARQ channel identifier for implicit cycling of HARQ channel identifiers. |
| } else if (Transmission mode == 0b1){ | | Only Long TTI shall be supported. |
| N_Frame | 2 | HARQ long TTI subpacket is transmitted during N_Frame 0b00: 2 frames 0b01: 3 frames 0b10: 4 frames 0b11: reserved |
| ACID | 4 | HARQ channel identifier |
| Reserved } } } | 5 | |

In Table 1, it will be appreciated that the transmission mode includes a first transmission mode (transmission mode 0b0: HARQ subpacket transmission with HFA) and a second transmission mode (transmission mode 0b1: HARQ subpacket transmission without HFA). The second transmission mode (transmission mode 0b1) supports long TTI (e.g., only Long TTI shall be supported.), and continuously perform a packet retransmission operation for each N_Frame (if HARQ long TTI subpacket is transmitted during N_Frame, and N_Frame is 4, 0b00: 2 frames, 0b01: 3 frames, 0b10: 4 frames).

Figure 3:
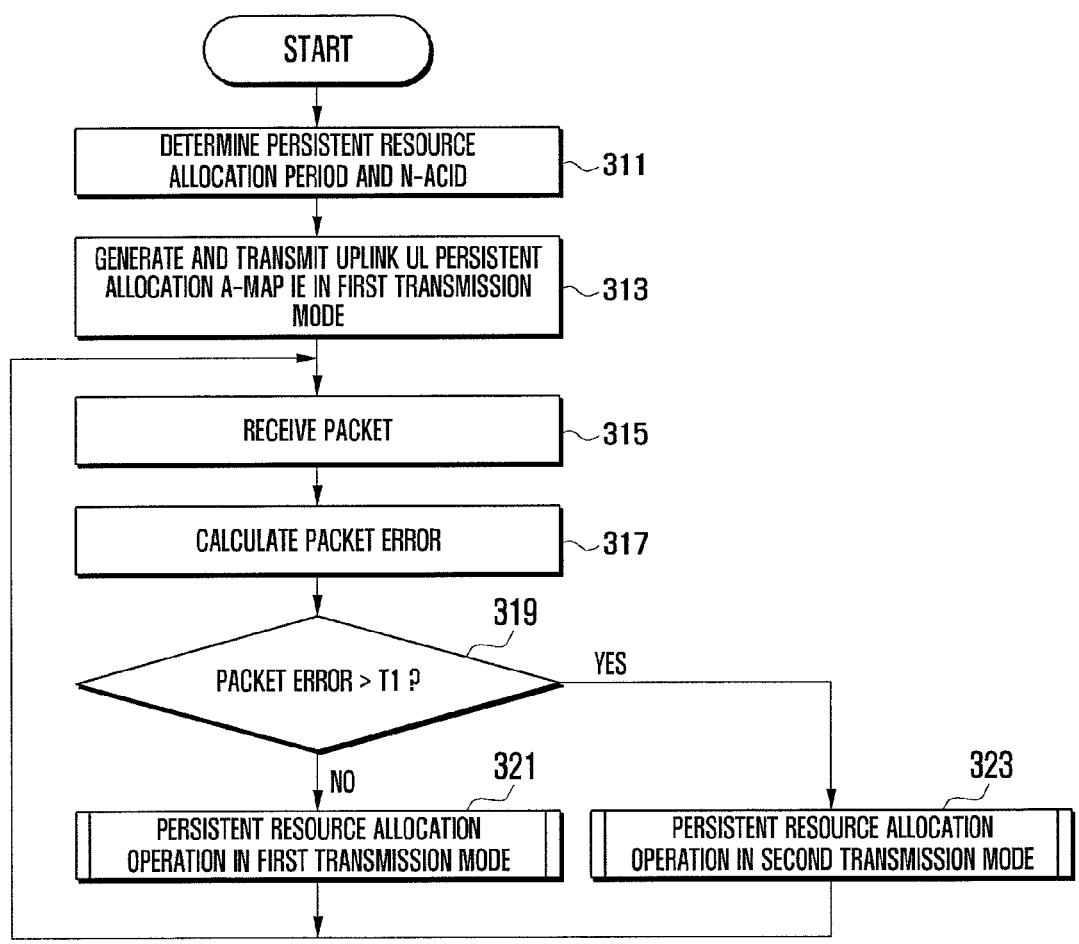
FIG. 3 is a flowchart illustrating a procedure of transmitting a persistent resource allocating Information Element (IE) by a sending end of a wireless communication system according to an exemplary embodiment of the present invention.

FIG. 3 is a flowchart illustrating a procedure of transmitting a persistent resource allocating IE by a sending end of a wireless communication system according to an exemplary embodiment of the present invention. For example, an operation of FIG. 3 may be performed by a base station, and the base station may be a receiving side receiving a packet which a terminal transmits.

Referring to FIG. 3, during a communication service transmitting a packet with a predetermined period as VoIP, the base station determines a persistent resource allocation period and an N-ACID according to a VoIP codec at step 311, and sets it in a first transmission mode (transmission mode=0b0), creates and transmits uplink UL persistent allocation A-map IE to the terminal at step 313. For example, the base station determines whether a terminal is in a VoIP communication mode. When the terminal is in the VoIP communication mode, the base station allocates a persistent resource for operating it in the first transmission mode. In this case, the persistent resource allocation IE transmitted from the terminal may be information except for parameters of the second mode (transmission mode 0b1) in the Table 1.

Next, the base station receives the packet transmitted from the terminal at step 315, and calculates a packet error at step 317. Here, the base station includes a reference value T1 for determining a transmission mode of a terminal. For example, the reference value T1 is a reference value for determining a communication environment of the terminal. The reference value T1 may be set by calculating an error of a received packet to set a suitable value in a state that the terminal is located at a cell boundary or is situated in an environment location in which communication is poor. At step 319, the base station determines whether the packet error is greater than a preset reference value T1. Accordingly, when the packet error is less than a preset reference value T1 (including a case where the packet error does not occur), the base station senses it at step 319. If the packet error is less than the preset reference value T1, the base station controls the terminal to be operated with a persistent resource in the first transmission mode at step 321. In this case, when the terminal is operated in the first transmission mode, the base station transmits HFA feedback according to presence of a packet error. When the terminal is operated in a first transmission mode in a previous state, the base station controls such that a first transmission mode remains without allocating the persistent resource. However, when the transmission mode is changed from the second transmission mode to a first transmission mode, the base station generates and transmits a uplink persistent resource allocation IE (UL persistent allocation A-map IE) to the terminal. In contrast, if the packet error is greater than the preset reference value T1, then the base station controls the terminal to be operated with a persistent resource in the second transmission mode at step 323.

Figure 4:
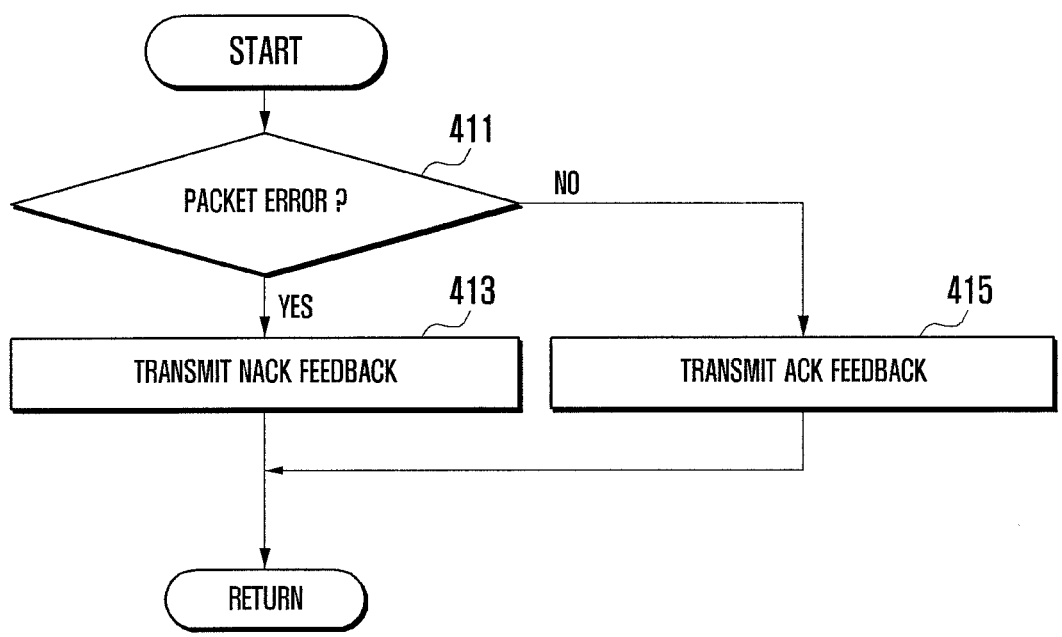
FIG. 4 is a flowchart illustrating an operation procedure in a first transmission mode by a base station such as, for example, the base station operating the procedure illustrated in FIG. 3 according to an exemplary embodiment of the present invention.

FIG. 4 is a flowchart illustrating an operation procedure in a first transmission mode by a base station such as, for example, the base station operating the procedure illustrated in FIG. 3 according to an exemplary embodiment of the present invention. For example, FIG. 4 is a flowchart illustrating a procedure of performing HFA feedback when a base station is operated in a first transmission mode at step 321 of FIG. 3 according to an exemplary embodiment of the present invention.

Referring to FIG. 4, the base station checks a receive packet at step 411. For example, the base station checks a receive packet to determine whether a packet error has occurred. When a packet error occurs, the base station transmits NACK feedback information to a terminal at step 413. In contrast, when the packet error does not occur, the base station transmits ACK feedback information to the terminal at step 415. For example, when the terminal allocates a persistent resource in the first transmission mode, the base station tests whether an error is included in the received packet and transmits HFA feedback information indicating presence of retransmission to the terminal.

As discussed above, when the packet error is greater than a preset reference value T1 at step 319, the base station controls the terminal to be operated in the second transmission mode at step 323. In this case, when the terminal is operated in the second transmission mode in this state, the base station controls the terminal such that the second transmission mode remains without allocating the persistent resource. However, when the terminal is changed from the first transmission mode to the second transmission mode, the base station generates and transmits Uplink (UL) persistent allocation A-map IE in the second transmission mode to the terminal. The persistent resource allocation IE of the second transmission mode transmitted from the terminal may be information from which parameters of the first transmission mode 0b0 are omitted from the Table 1.

In a case of the second transmission mode, the base station may variably control the number of packets transmitted during a persistent resource allocation period according to the packet error.

Figure 5:
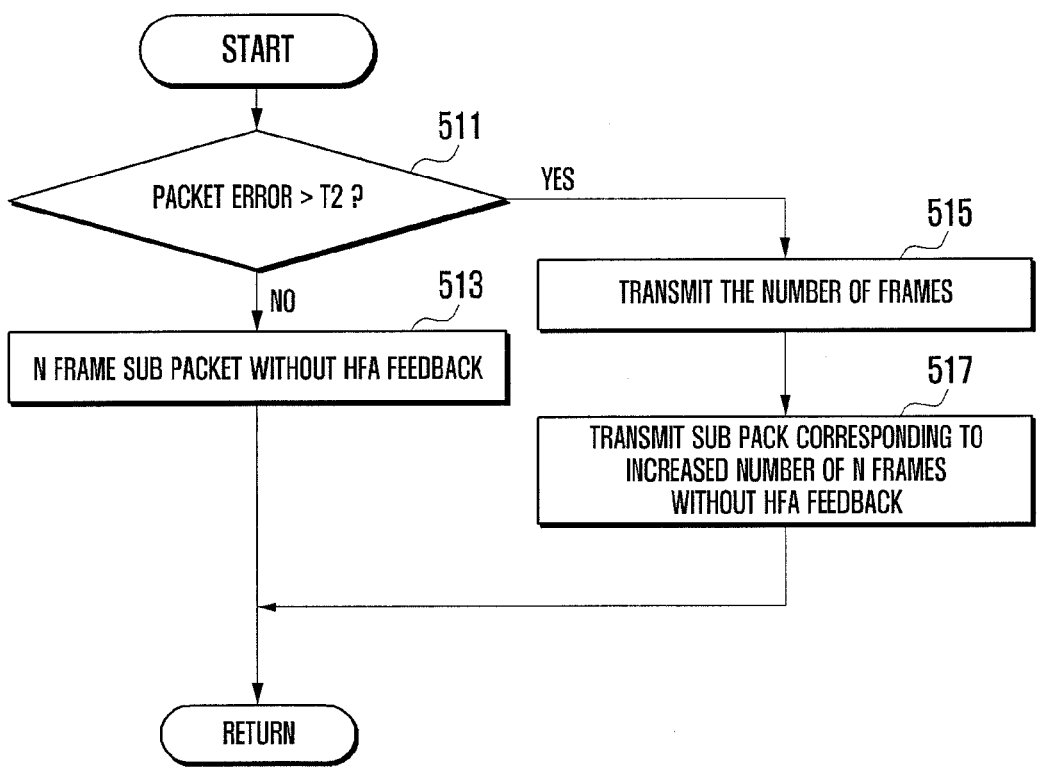
FIG. 5 is a flowchart illustrating an operation procedure in a second transmission mode by a base station such as, for example, base station operating the procedure illustrated in FIG. 3 according to an exemplary embodiment of the present invention.

FIG. 5 is a flowchart illustrating an operation procedure in a second transmission mode by a base station such as, for example, the base station operating the procedure illustrated in FIG. 3 according to an exemplary embodiment of the present invention. For example, FIG. 5 is a flowchart illustrated a persistent resource allocating method in which a base station is operated in a second transmission mode according to an exemplary embodiment of the present invention.

Referring to FIG. 5, a base station determines whether a packet error is greater than a second reference value T2 in a second transmission mode at step 511. Here, the second reference value T2 is greater than the reference value T1, and is to variably operate the transmission number of packets during an N_frame time period according a packet error rate in the second transmission mode. In this case, the base station determines whether the packet error rate is less than the second reference value T2 at step 511. The base station controls the terminal such that a packet is transmitted with the number of frames (HARQ long TTI subpacket of two frames during N_frame) set during an N_frame period without HFA feedback at step 513. However, if the packet error is greater than the second reference value T2, then the base station increase the number of frames at step 515 and controls the terminal such that a sub packet is transmitted corresponding to the increased number of frames during an N_frame time period without HFA feedback at step 517. For example, the base station calculates an error of a packet received from the terminal and allocates a persistent resource to the terminal changes the transmission number of a sub packet during an N_frame according to the packet error rate.

As an example, a case of the Table 1 is described. It is appreciated that three types of packet transmitting methods are implemented according to a packet error rate. For example, supposing that reference values for determining the packet error rate are T1, T2, and T3, a base station calculates the packet error rate. As a result, when T1<packet error rate<T2, a persistent resource is allocated such that the base station allocates a persistent resource to the terminal to transmit a packet twice (N_frame=2 frames) during a persistent resource allocation period of a corresponding ACID. If T2<packet error rate<T3, the base station allocates the persistent resource to the terminal to transmit the packet three times during a persistent resource allocation period of a corresponding ACID (N_frame=3 frames). When the packet error rate is equal to or greater than T3, the base station may control the terminal to transmit the packet four times (N_frame=4 frames) during a persistent resource allocation period of a corresponding ACID. Moreover, for example, supposing that the reference values are T1 and T2, the base station calculates an error rate of received packets. As a result, if T1<packet error rate<T2, the base station allocates a persistent resource to the terminal such that the terminal transmits the packet twice (N_frame=2 frames) during a persistent resource allocation period of a corresponding ACID. When the packet error rate is equal to or greater than T2, the base station checks a packet error rate in a previous state. If the packet error rate is equal to or greater than T2 in the previous state, the base station may control the terminal to transmit the packet with the increased transmission number (N_frame=3 frames, 4 frames) in comparison with the transmission number in the previous state during a persistent resource allocation period of corresponding ACID.

As illustrated in FIGS. 3 to 5, when the terminal requests a traffic service periodically communicating with a service such as VoIP, the base station determines a persistent allocation period and N_ACID of a resource to be allocated as a persistent resource according to VoIP codec and allocates and transmits persistent resource allocation IE of uplink in the first transmission mode (Transmission mode=0b0) to the terminal. For example, upon initial VoIP service request, the base station allocates a persistent resource in the first transmission mode and notifies it to the terminal. Subsequently, the base station receives the allocated persistent packet from the terminal to calculate a packet error. When the packet error occurs, the base station transmits HFA feedback to a corresponding terminal. Further, when the packet error is less than or equal to the reference value T1, the base station maintains persistent resource allocation in the Transmission mode=0b0. However, if the packet error is greater than the reference value T1, the base station determines a state that communication is not smooth due to low signal strength of the packet received from the terminal. To extend the coverage of uplink, the base state changes the persistent resource allocation scheme to the second transmission mode (Transmission mode=0b1), and notifies it to the terminal.

In this case, when the persistent resource allocation scheme is firstly changed to the second transmission mode (for example, the persistent resource allocation scheme is firstly changed to from the first transmission mode to the second transmission mode), the base station sets an N_Frame to a low value and is operated in the second transmission mode (Transmission mode=0b0). Further, the base station calculates a packet error of a received packet without HFA feedback in the second transmission mode. When the packet error is equal to or greater than T2, the base station determines a current state as a state that the coverage is insufficient, and increases the N_Frame. The base station momentary change the persistent resource allocation mode and operates persistent resource allocation while monitoring an error of the received packet. Further, when a communication environment of the terminal become excellent in a state of performing the second transmission mode, the base station reduces an error rate of the packet received from the terminal. In this case, when the packet error rate is less than the reference value T1, the base station senses switching from the second transmission mode to the first transmission mode, and allocates a persistent resource allocation IE of uplink to the first transmission mode to the terminal and transmits it to the terminal.

Figure 6:
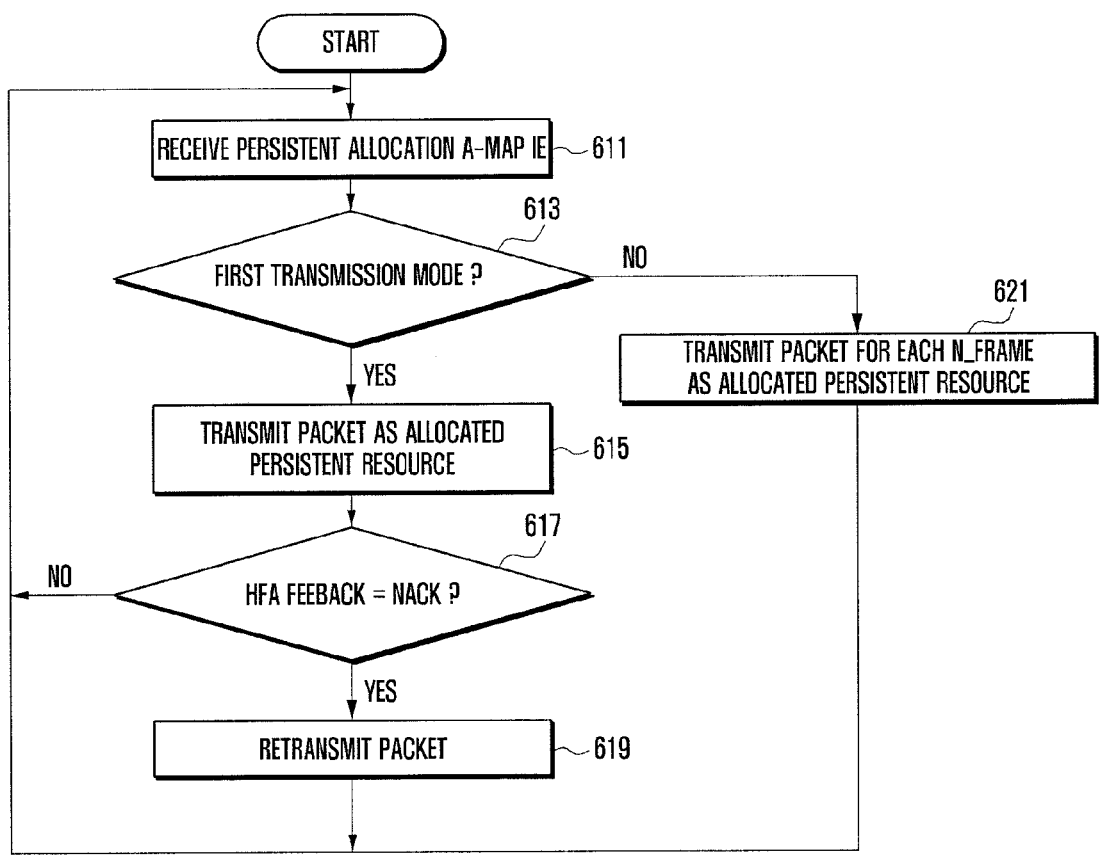
FIG. 6 is a flowchart illustrating a method for receiving a persistent resource allocating IE by a receiving end of a broadband wireless communication system according to an exemplary embodiment of the present invention.

FIG. 6 is a flowchart illustrating a method for receiving a persistent resource allocating IE by a receiving end of a broadband wireless communication system according to an exemplary embodiment of the present invention.

Referring to FIG. 6, a terminal receives a persistent resource allocation IE (persistent allocation A-map IE) from a base station at step 611. As illustrated above, the base station tests a packet error rate to determine a communication environment of the terminal based on the persistent resource allocation IE. When the communication environment is changed (e.g., when the communication environment is changed from the first transmission mode to the second transmission mode or from the second transmission mode to the first transmission mode, or when N_frame is changed in the second transmission mode), the base station creates and transmits the persistent allocation A-map IE to the terminal. In this case, when the communication environment is not changed, the base station maintains the persistent allocation A-map IE at it is.

Accordingly, when receiving the persistent allocation A-map IE, the terminal determines a transmission mode at step 613. For example, according to exemplary embodiments of the present invention, the terminal may determine whether the terminal is in a first transmission mode or a second transmission mode. As an example, the persistent allocation A-map IE includes information of the first transmission mode (transmission mode=ObO) or the second transmission mode (transmission mode=Ob1). When the current mode is determined to be the first transmission mode at step 613, the terminal transmits a packet as an allocated persistent resource at step 615, and analyzes HARQ feedback information received from the base station at step 617. When the HFA feedback is NACK feedback at step 617, the terminal transmits a retransmission packet within a persistent allocation period before transmitting an initial packet of a next ACID at step 619. Conversely, when the HFA feedback is ACK feedback at step 617, the terminal does not perform a retransmission operation during a persistent allocation period, and transmits a next packet during a persistent allocation period of a next ACID. Accordingly, the retransmission mode means that the terminal is in an excellent communication environment. In this case, the terminal determines presence of retransmission according to packet transmission and HARQ feedback information (HARQ subpacket transmission with HFA).

When the current mode is determined to be the second transmission mode at step 613, the terminal transmits the packet for each N_frame to a persistent resource allocated in the second transmission mode at step 621 (HARQ subpacket transmitted during N_frame, in case of the table 1, N_frame is 2 frames, 3 frames, or 4 frames). In this case, the N_frame is the transmission number of packets to be continuously transmitted during a persistent allocation period of a corresponding ACID, which is determined by the base station. As described above, the base station calculates an error rate of a packet received from the terminal, and determines an N_frame according to the result. For example, when a communication condition of the terminal is poor, the base station determines the continuously transmitted number of the packet according to a grade during a persistent allocation period. In this case, the base station does not transmit HARQ feedback information to the terminal.

As described above, the terminal receives UL Persistent Allocation A-MAP IE to check a transmission mode. In this case, when the current mode is the first transmission mode (Transmission mode=0b0), the terminal performs initial transmission according to the allocated period, checks HFA feedback of the initially transmitted packet. When receiving the NACK feedback, the terminal transmits a retransmission packet. Further, when the transmission mode is the second transmission mode (Transmission mode=0b1), the terminal transmits the packet using Long TTI during N_Frame of a persistent allocation period of a corresponding ACID. In this case, as illustrated above, the N_frame is determined by the base station.

Figure 7:
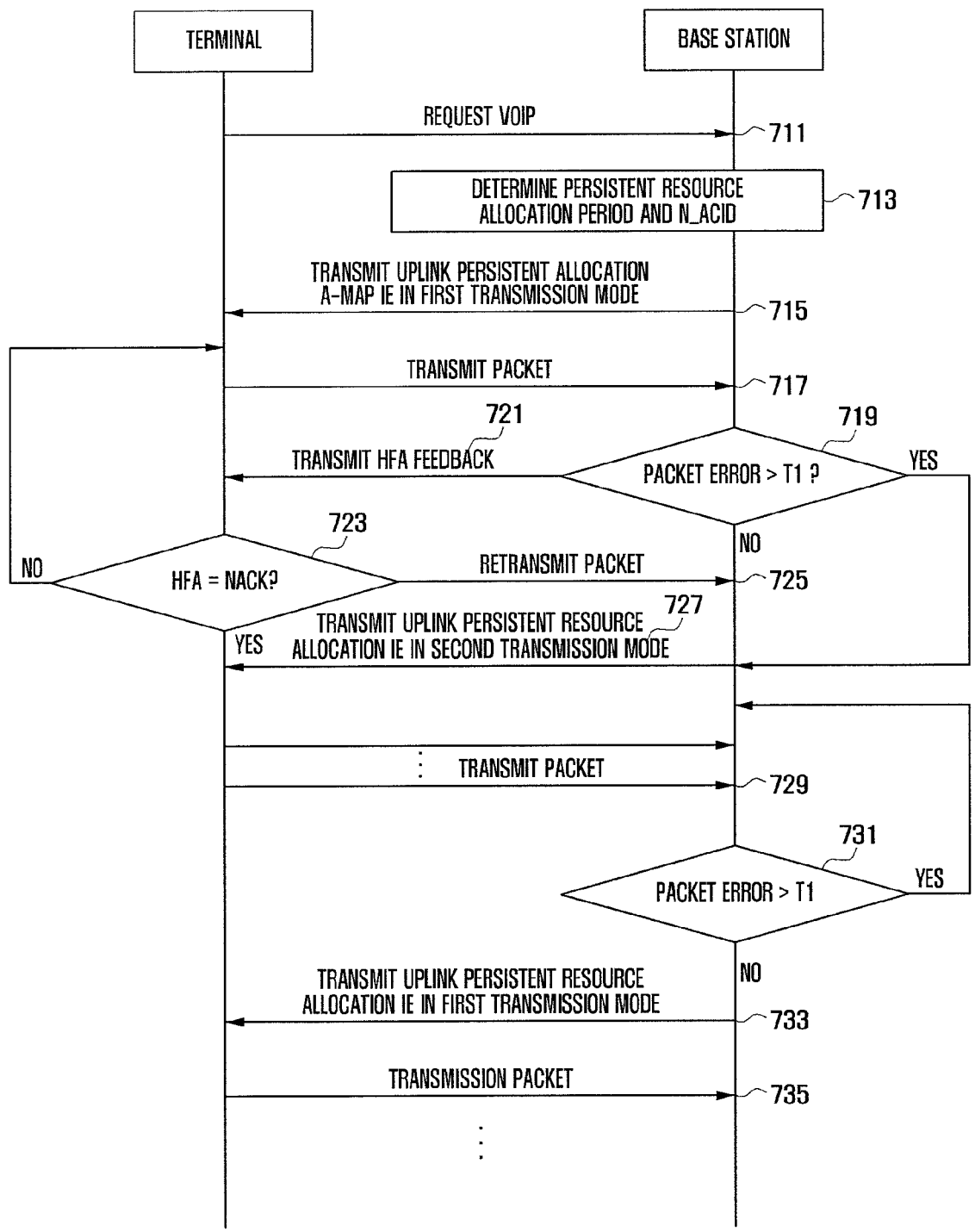
FIG. 7 is a flowchart illustrating a packet communication procedure between a base station and a terminal when a persistent resource is allocated in a broadband wireless communication system according to another exemplary embodiment of the present invention.

FIG. 7 is a flowchart illustrating a method for allocating a persistent resource between a base station and a terminal to transmit a packet according to an exemplary embodiment of the present invention. Although it is assumed in FIG. 7 that a VoIP service is used, all traffic services which a base station and a terminal periodically communicate is applicable.

Referring to FIG. 7, when a terminal requests a VoIP service at step 711, a base station determines a persistent resource allocation period and an N_ACID at step 713. Here, referring to FIG. 2, the persistent resource period may be 4 frames, and N_ACID may be 2, 3, 4, 5. Next, the base station sets a mode to a first transmission mode, creates an uplink persistent resource allocation IE (uplink persistent allocation A-map IE), and transmits the uplink persistent allocation A-map IE to the terminal at step 715. Then, the terminal transmits a packet according to the uplink persistent allocation A-map IE received from the base station at step 717. In this case, the packet may be a VoIP packet transmitted with a persistent resource allocation period. As shown in FIG. 2, the terminal transmits a new packet while changing an ACID (2, 3, 4, 5, 2, 3, 4, 5 . . . ) for each persistent resource allocation period.

Then, the base station determines whether an error occurs in a received packet and calculates an error rate when the error occurs at step 719. In this case, when the packet error rate does not exceed a preset reference value T1, the base station maintains a first transmission mode, and transmits an HFA feedback according to whether a packet error occurs at step 721. That is, when the packet error does not occur, the base station transmits ACK feedback at step 721. Although the packet error occur but does not exceed the preset reference value T1, the base station transmits NACK feedback such that the terminal transmits a retransmission packet at step 721.

After transmitting the packet at step 717, the terminal waits for HFA feedback from the base station in the first transmission mode. In this case, when the HFA feedback is received, the terminal tests the received HFA feedback at step 723. When the HFA feedback is ACKed, the terminal returns to step 717 and transmits a new packet during a next persistent resource allocation period. When the HFA feedback is NACKed, the terminal transmits a retransmission packet at step 725. The terminal repeatedly performs the foregoing operation (HARQ subpacket transmission with HFA) in the first transmission mode.

When the packet error exceeds the preset reference value T1 while performing the foregoing operation, the base station senses it at step 719 and sets the terminal to the second transmission mode and creates and transmits the uplink persistent resource allocation IE to the terminal at step 727. In this case, the persistent resource allocation IE to be transmitted to the terminal includes N_frame information indicating the transmission number of a packet during a persistent resource allocation period. Further, the N_frame may be determined by the method described associated with FIG. 5.

Each time a transmission mode is changed from the base station, the terminal receives the uplink persistent resource allocation IE. Accordingly, when receiving the uplink persistent resource allocation IE, the terminal checks a transmission mode. When the transmission mode is a second transmission mode, the terminal transmits a sub packet by the number of N_frame during a persistent resource allocation period at step 729. That is, when the N_frame is 2, the terminal transmits the same packet during the persistent resource allocation period twice. When the N_frame is 3, the terminal transmits the same packet during the persistent resource allocation period three times. A long TTI is transmitted as the same packet. Further, because there is no HFA feedback in the second transmission mode, the terminal does not perform a retransmission operation.

As mentioned above, when the terminal transmits the packet in the second transmission mode, the base station receives a plurality of packets during a persistent resource allocation period. The base station determines whether an error occurs in the received packets, and processes packets in which the error does not occur. Accordingly, in a case of the second transmission mode, because the same packet is repeatedly transmitted N_frame times although the terminal is located in a poor communication environment, the base station processes only packet of N_frame packets in which the error does not occur. Accordingly, communication efficiency may be increased in a situation in which the communication environment is poor. Further, in a case of the second transmission mode, the base station does not transmit HFA feedback to the terminal.

Furthermore, the base station tests an error of a received packet at step 731. If the packet error rate does not exceed a preset reference value T1, the base station transmits a uplink persistent resource allocation IE in a first transmission mode to change the transmission mode to the first transmission mode at step 733. The terminal and the base station communicate with each other to transmit the packet in the first transmission mode at step 735. Conversely, when the packet error rate exceeds a preset reference value T1, the base station returns to step 729 and performs packet communication with the terminal in the second transmission mode.

As described above, in a broadband mobile communication system such as an IEEE 802.16m system, when allocating a persistent resource, because the terminal may transmit an HARQ sub packet in a continuous frame without receiving the HARQ feedback from the base station, uplink coverage may be extended. When persistent resource allocation is used in uplink, exemplary embodiments of the present invention may transmit an HARQ sub packet from the base station without receiving the HARD feedback during the persistent resource allocation period to improve uplink coverage of an allocated persistent resource.

When the system allocates a persistent resource, HARQ feedback is not received and the HARQ sub packet is transmitted to transmit more HARQ sub packets during a predetermined time period, thereby extending the coverage of a terminal in uplink.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating a persistent resource in a mobile communication system, the method comprising:
    determining an error rate of a received packet;
    transmitting a uplink persistent resource allocation Information Element (IE) including an N_frame which continuously transmits during a persistent allocation period when the error rate of the received packet exceeds a preset reference value; and receiving the same packets of the N_frame during the persistent resource allocation period and not transmitting Hybrid Automatic Repeat reQuest (HARQ) Feedback Allocation (HFA) feedback according to the reception of the packet.

2. The method of claim 1, further comprising:
changing the N_frame according to the error rate of the received packet; and
generating and transmitting a uplink persistent resource allocation IE including a changed N_frame when the N_frame is changed.

3. The method of claim 2, wherein the N_frame is transmitted during a long Transmission Time Interval (TTI).

4. The method of claim 3, wherein the packet is a Voice over Internet Protocol (VoIP) packet.

5. A method for allocating a persistent resource in a mobile communication system, the method comprising:
transmitting a uplink persistent resource allocation Information Element (IE) of a first transmission mode when a traffic service of persistent resource allocation is requested, the first transmission mode being a transmission mode having Hybrid Automatic Repeat reQuest (HARQ) Feedback Allocation (HFA) feedback;
determining an error rate of a packet received in the first transmission mode, and maintaining a persistent resource allocation Identification (ID) of a first transmission mode when the error rate of the packet is less than or equal to a preset reference value;
transmitting a uplink persistent resource allocation IE of a second transmission mode including an N_frame which continuously transmits during a persistent allocation period when the error rate of the packet exceeds the preset reference value, the second transmission mode being a transmission mode in which HFA feedback is not performed; and
receiving the same packets of the N_frame during the persistent resource allocation period and not transmitting HFA feedback according to the reception of the packet.

6. The method of claim 5, further comprising:
determining an error rate of a packed received in the second transmission mode, and maintaining a persistent resource allocation IE in the second transmission mode when the error rate of the packet exceeds the preset reference value; and
transmitting the uplink persistent resource allocation IE of a first transmission mode when the error rate of the packet is less than or equal to the preset reference value, and switching a transmission mode from the second transmission mode to the first transmission mode.

7. The method of claim 6, further comprising:
changing the N_frame according to the error rate of the received packet, and
generating and transmitting a uplink persistent resource allocation IE including a changed N_frame when the N_frame is changed.

8. The method of claim 7, wherein the N_frame is transmitted during a long Transmission Time Interval (TTI).

9. The method of claim 8, wherein the packet is a Voice over Internet Protocol (VoIP) packet.

10. A method for allocating a persistent resource in a mobile communication system, the method comprising:
transmitting a uplink persistent resource allocation Information Element (IE) in a first transmission mode or a second transmission mode to a terminal according to a communication environment of the terminal by a base station;
wherein the first transmission mode processing step includes:
transmitting a uplink persistent resource allocation IE of a first transmission mode by a base station when a traffic service of persistent resource allocation is requested, the first transmission mode being a transmission mode having Hybrid Automatic Repeat reQuest (HARQ) Feedback Allocation (HFA) feedback;
transmitting a packet in the first transmission mode to the base station by the terminal;
determining an error rate of a packet received in the first transmission mode by the base station, and transmitting HFA feedback indicating whether an error occurs in the received packet when an error rate of the packet is less than or equal to a preset reference value; and
transmitting a retransmission packet to the base station by the terminal when received HFA feedback is NACK feedback, and
wherein the second transmission mode processing step includes:
transmitting a uplink persistent resource allocation IE of a second transmission mode including an N_frame which continuously transmits during a persistent allocation period by the base station when the error rate of the packet exceeds the preset reference value, the second transmission mode being a transmission mode in which HFA feedback is not performed;
transmitting identical packets of the N_frame during a persistent resource allocation period by the terminal; and
receiving the identical packets of the N_frame during the persistent resource allocation period by the base station, not transmitting HFA feedback according to reception of the packet by the base station.

11. The method of claim 10, further comprising:
determining an error rate of a packed received in the second transmission mode by the base station, and maintaining a persistent resource allocation IE in the second transmission mode by the base station when the error rate of the packet exceeds the preset reference value; and
transmitting the uplink persistent resource allocation IE of a first transmission mode when the error rate of the packet is less than or equal to the preset reference value, and switching a transmission mode from the second transmission mode to the first transmission mode by the base station.

12. The method of claim 11, further comprising:
changing the N_frame according to the error rate of the received packet, and
generating and transmitting a uplink persistent resource allocation IE including a changed N_frame when the N_frame is changed.

13. A mobile communication system for allocating a persistent resource, the system comprising:
a base station for determining an error rate of a received packet, for transmitting a uplink persistent resource allocation Information Element (IE) including an N_frame which continuously transmits during a persistent allocation period when the error rate of the packet exceeds a preset reference value, and receiving the same packets of the N_frame during the persistent resource allocation period and not transmitting Hybrid Automatic Repeat reQuest (HARQ) Feedback Allocation (HFA) feedback according to the reception of the packet; and
a terminal for continuously transmitting the same packet of an N_frame during the persistent resource allocation period when the base station receives the uplink persistent resource allocation IE including the N_frame.

14. The mobile communication system of claim 13, wherein the base station transmits an uplink persistent resource allocation IE having HFA feedback to the terminal when the error rate of the packet is less than or equal to the preset reference value, and transmits HFA feedback according to presence of error occurrence of the packet when the packet is received, and wherein the terminal transmits the packet during the persistent resource allocation period when the uplink persistent resource allocation IE having HFA feedback is received, and transmits a retransmission packet to the base station when HFA feedback received from the base station is NACKed.

* * * * *